(12) United States Patent
Herrejon et al.

(10) Patent No.: US 11,005,339 B1
(45) Date of Patent: May 11, 2021

(54) SPINNING AMUSEMENT PARK RIDE WITH ONBOARD POWER GENERATION

(71) Applicant: Disney Enterprises, Inc., Burbank, CA (US)

(72) Inventors: Guillermo L. Herrejon, Valencia, CA (US); Robert A. Sebesta, Saugus, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/811,743

(22) Filed: Mar. 6, 2020

(51) Int. Cl.
*H02K 7/18* (2006.01)
*A63G 23/00* (2006.01)

(52) U.S. Cl.
CPC ........... *H02K 7/1853* (2013.01); *A63G 23/00* (2013.01)

(58) Field of Classification Search
CPC . A63G 23/00; A63G 1/00; A63G 1/12; A63G 1/14; A63G 1/16; A63G 1/48; A63G 1/46; A63G 31/02; A63G 31/00; A63B 22/14; A63B 22/16; A63B 22/18; A63B 21/0054; A63B 31/02; H02K 7/1853; H02K 7/1861; H02K 7/00; H02P 9/04; F03G 5/06; F03G 6/06
See application file for complete search history.

(56) References Cited

U.S. PATENT DOCUMENTS

| | | | | |
|---|---|---|---|---|
| D180,585 S | * | 7/1957 | Disney | D21/830 |
| 5,243,224 A | * | 9/1993 | Tagney, Jr. | A63B 19/04 |
| | | | | 290/1 R |
| 5,795,235 A | * | 8/1998 | Ullrich | A63G 1/16 |
| | | | | 472/14 |
| 7,560,822 B1 | * | 7/2009 | Hoffmann | A63B 21/0053 |
| | | | | 290/1 R |
| 2005/0130741 A1 | * | 6/2005 | Pandian | F03G 5/06 |
| | | | | 463/36 |
| 2005/0248159 A1 | * | 11/2005 | Seoane | F03G 6/06 |
| | | | | 290/1 R |
| 2007/0049384 A1 | * | 3/2007 | King | A63G 31/00 |
| | | | | 472/59 |
| 2008/0252180 A1 | * | 10/2008 | Markham | A63G 9/16 |
| | | | | 310/40 R |
| 2011/0272944 A1 | * | 11/2011 | Peng | F03G 5/06 |
| | | | | 290/50 |

(Continued)

*Primary Examiner* — Michael D Dennis
(74) *Attorney, Agent, or Firm* — Snell & Wilmer L.L.P.; Kent A. Lembke

(57) ABSTRACT

A spinning ride system adapted to convert kinetic energy to electrical energy onboard each of its vehicles. The system includes a passenger vehicle with a chassis for receiving a passenger. The system includes a ride structure including a support arm supporting the passenger vehicle, and the ride structure moves the support arm along a ride path. The system includes a mounting sleeve statically attached to the chassis and pivotally coupled to the support arm. A user input mechanism is attached to the mounting sleeve adapted to receive user input forces to cause the chassis to have movements relative to the support arm. The system includes an electrical component provided on or in the chassis and includes a kinetic energy conversion assembly with an electrical generator converting kinetic energy of the chassis during the movements (e.g., spinning) to electrical energy used to power the electrical component.

19 Claims, 3 Drawing Sheets

(56) References Cited

U.S. PATENT DOCUMENTS

| | | | |
|---|---|---|---|
| 2012/0006221 A1* | 1/2012 | Crawford | A63G 31/02 104/53 |
| 2014/0261052 A1* | 9/2014 | Baxter | A63G 1/10 104/74 |

* cited by examiner

SPINNING AMUSEMENT PARK RIDE WITH ONBOARD POWER GENERATION

BACKGROUND

1. Field of the Description

The present description relates, in general, to amusement park rides with onboard power in its vehicles. More particularly, the description relates to an amusement park ride with spinning or spin-capable vehicles ("a spinning amusement park ride") in which each vehicle is configured to enable generating of onboard power during ride operations.

2. Relevant Background

Amusement parks continue to search for ways to continue to entertain and excite their visitors. In this regard, operators of amusement parks are always looking for new ride designs and for ways to make existing rides more interesting to encourage riders to enjoy the ride multiple times per visit to the park.

In some cases, the basic ride structure is retained and the passenger vehicles are updated or reconfigured to enhance the ride experience. For example, a ride may include vehicles in which the body or chassis is supported on a ride structure that moves the vehicles along a ride path, and each body or chassis is allowed to be moved or oriented in response to input from its passengers or riders. In one well-known design, the body or chassis is designed to take on the appearance of giant teacups that can be spun about a center vertical axis as the vehicle is moved along a ride path by the underlying ride structure. To update the ride, each vehicle may be modified to include electronic components that create special effects such as unique lighting, differing sounds, visual displays, and so on.

A drawback of such modifications, though, is the need for onboard power to run the electronic components. Due to the movements and complexity of the ride structure and the spinning vehicle chassis, it is impractical to run power cables to each vehicle. Some rides may utilize electrical slip rings and bus bars to transmit electrical power to such moving and spinning vehicles, but it can be complicated and expensive (e.g., high installation and maintenance costs) to couple non-rotating elements to rotating ones such as the vehicle chassis or body.

Hence, there remains a demand for new ways to provide onboard electrical power for vehicles of a spinning ride, and, preferably, these new designs would be less expensive and require less modifications to the ride structure to install on new and retrofitted amusement park rides.

SUMMARY

To address the above and other issues, the inventors designed a new ride (or "ride system") for use in theme and other amusement parks. The new ride includes a ride structure upon which a plurality of passenger vehicles is supported, and the ride structure is configured to move the vehicles along one or more ride paths. Each vehicle is coupled to the ride structure, and this coupling or mounting is designed to allow each vehicle's body or chassis (in which the riders or passengers are seated or supported) to have one or more movements relative to the ride structure, e.g., relative to the support components of the ride structure. For example, each vehicle may be rotatably or pivotally coupled with a rigid support rod or arm extending from the ride structure such as with a sleeve or hollow tube extending over the support rod/arm and with a bearing assembly disposed between the sleeve's inner surfaces and the support rod/arm.

A user input mechanism is attached or linked to the sleeve or hollow tube (or other component pivotally or rotatably coupling the sleeve or tube to the support aim/rod). Riders or passengers in the vehicle's body or chassis can interact with the user input mechanism to apply forces (or provide user input) to cause the vehicle's body or chassis to move relative to the ride structure (e.g., spin about an axis extending through the support arm or rod). Hence, the vehicle's body or chassis has kinetic energy that varies with the input forces (e.g., increases with greater input forces or larger amounts of user input).

Significantly, the new amusement park ride or ride system provides on each vehicle body or chassis an assembly for converting the kinetic energy into electrical energy ("a conversion assembly"). This assembly includes an electrical generator (such as an alternator) affixed to or within the body or chassis to move with the vehicle, and the electrical generator is driven by a drive member (e.g., a chain(s), a belt(s), or the like) that is coupled both to an input shaft or element of the electrical generator and the ride structure (e.g., to the support arm/rod). During movement of the vehicle's body or chassis relative to the ride structure, the electrical generator converts the kinetic energy of the body or chassis into electricity (or electrical power) that may be fed to a battery or storage device for use in powering onboard electrical components (e.g., display devices including lights, audio components, and so on) and/or their controllers or may be fed directly to such electrical components (e.g., to illuminate a set of lights with brightness varying with amount of kinetic energy imparted to the vehicle's body or chassis by the passengers or riders).

More particularly, a ride system is provided that is adapted to convert kinetic energy to electrical energy onboard each of its vehicles. The system includes a passenger vehicle with a chassis for receiving a passenger. The system also includes a ride structure including a support arm supporting the passenger vehicle, and the ride structure moves the support arm along a ride path during operations of the ride system. The system further includes a mounting sleeve statically attached to the chassis and pivotally coupled to the support arm. A user input mechanism is attached to the mounting sleeve, and this mechanism (e.g., a handwheel or cranking assembly) is adapted to receive user input forces to cause the chassis to have movements relative to the support arm in response to the user input forces. Further, the system includes an electrical component provided on or in the chassis, and, significantly, the system includes a kinetic energy conversion assembly with an electrical generator converting kinetic energy of the chassis during the movements to electrical energy used to power the electrical component.

In some preferred embodiments, the movements of the chassis include spinning about a rotation axis extending through the mounting sleeve, and the spinning can be first in a counterclockwise direction and second in a clockwise direction during the movements. In this and other embodiments, the electrical generator includes an alternator, and the system includes a battery electrically coupled to an outlet of the alternator to store the electrical energy and electrically coupled to the electrical component. The kinetic energy conversion assembly may include a first support member statically mounted to the support arm, a second support member attached to an input drive shaft of the alternator, and a drive member supported upon the first and second support members, whereby the spinning of the chassis causes the drive member to rotate the input drive shaft about its central axis.

The first support member may be circular (e.g., a gear, a sprocket, a wheel, or the like) and have an outer diameter, and, similarly, the second support member may be circular with an outer diameter. The ratio of the outer diameter of the first support member to the outer diameter of the second support member is at least 2:1. In some cases, the electrical component includes at least one of a light, a display element, and an audio element. Further, the electrical component is coupled to the electrical generator to receive the electrical energy from the electrical generator during the movements of the chassis, and the electrical component has operations varying with a magnitude of the electrical energy.

DETAILED DESCRIPTION

Embodiments described herein are directed toward a ride system (or park ride) that is adapted such that each vehicle has a kinetic energy conversion assembly adapted to convert kinetic (or mechanical) energy into electrical energy. In some useful embodiments, the ride system includes a plurality of vehicles each with a body or chassis adapted to be spun or rotated or otherwise placed in motion when its one or more passengers provide user input or an input motive force (e.g., crank on a handwheel or the like). The kinetic energy conversion assembly functions during such spinning or rotation to convert the kinetic energy of the chassis or body into electrical energy that is used to operate onboard electrical components directly or after first being used to charge a battery (or other power storage device).

The inventors were driven to create the new ride system, in part, by the need to find a more cost-effective solution for getting power onboard a spinning ride. The new ride system is adapted to convert the kinetic energy produced by passengers spinning their vehicles (such as in a classic tea cup-type ride) into electrical energy. The vehicle has a vertical axis on which it rotates relative to a supporting ride structure. Passengers or riders use a static wheel (static relative to the vehicle's body/chassis) inside the vehicle to rotate the vehicle about that vertical axis. By mounting a gear or sprocket onto the vertical axis, an alternator or other electrical generator can be connected to that power transmission element. The alternator converts the kinetic energy into electrical energy, and this electrical energy can then be stored into one or more onboard batteries to power electrical components on the rotating vehicle.

This approach provides a much less complex and expensive way to provide onboard power in a spinning ride. Prior to this design, electrical slip rings and bus bars were used or contemplated to transmit electrical power from a non-rotating element to a rotating one, but slip rings can be expensive and have wear items that can lead to increased maintenance costs. The new ride system uses proven technologies (e.g., an alternator such as one found in an automobile) in a new and exciting way to take advantage of the energy already being created or input to the vehicle by passengers spinning their vehicles to run onboard electrical components such as light emitting diodes (LEDs) or other lights.

Figure 1:
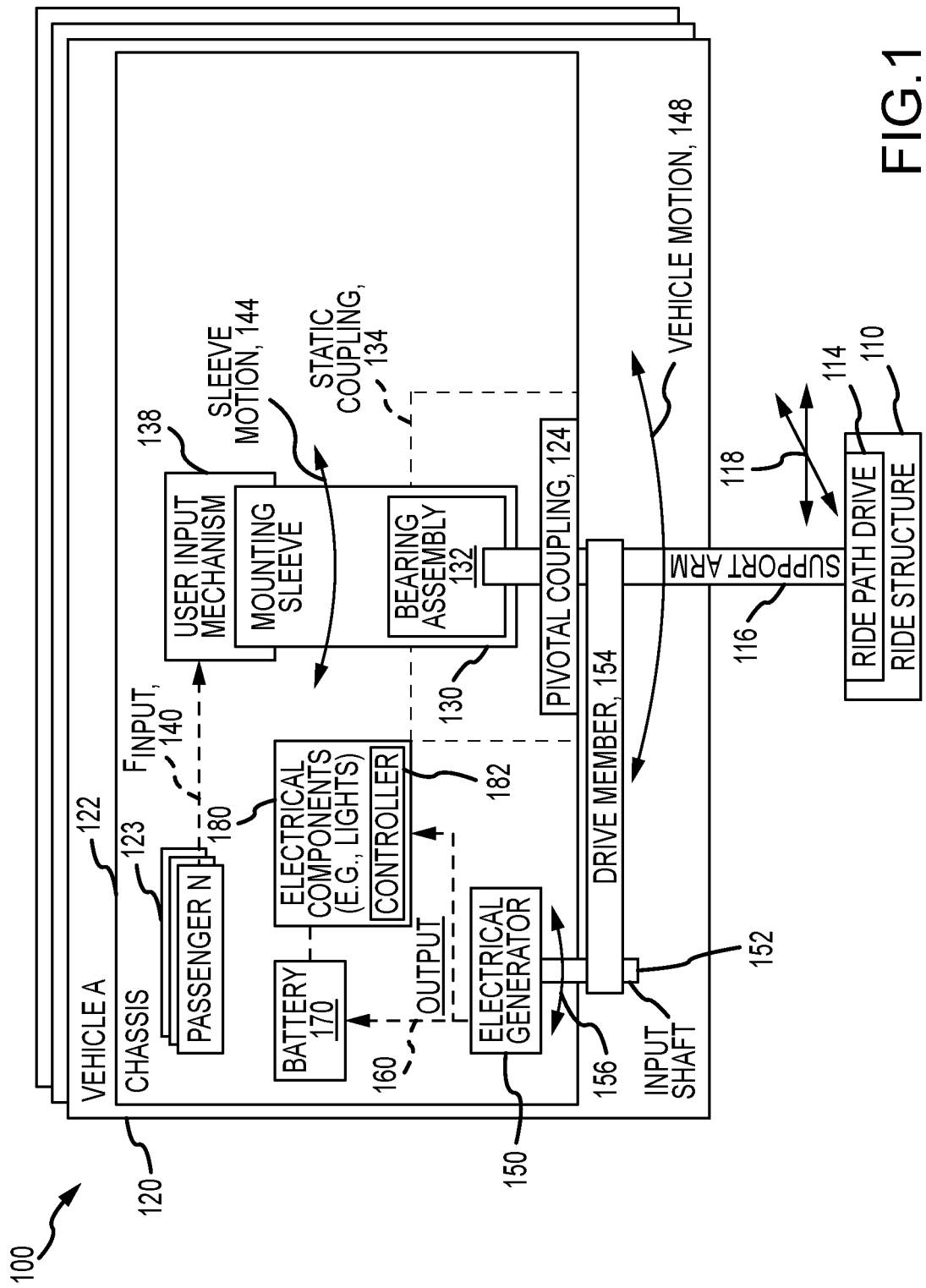
FIG. 1 is a functional block drawing of an amusement park ride or ride system of the present description.

FIG. 1 is a functional block drawing of an amusement park ride or ride system 100 of the present description. As shown, the ride system 100 includes a ride structure 110 that is adapted to support and move one-to-many passenger vehicles 120 along a ride path. To this end, the ride structure 110 includes a ride path drive system 114 that includes a support arm or rod 116 for each vehicle 120, and the support arm or rod 116 is moved 118 along a ride path defined for the vehicle 120. For example, the ride system 100 may be adapted to provide a tea cup-type ride, and the movement 118 may be provided with a drive system 114 that moves subsets of the vehicles each being moved about a large circle as if on a disc or plate that itself may spin about a vertical axis. The support arm or rod 116, though, typically is static or not rotating relative to the drive system 114 during the movement 118.

Each vehicle 120 includes a chassis or body 122 adapted for holding one or more passengers or riders 123 such as with benches or seats (not shown), and it may take nearly any outer shape or appearance such as, but not limited to, an open-top circular bowl or cup configuration with one or more doors or slots in its sidewalls for passenger boarding. The chassis 122 is coupled via a pivotal coupling 124 to the support arm or rod 116 such that the vehicle 120 moves along the ride path due to the movement 118 of the support arm or rod 116 by the path drive system 114 but is able to rotate or move relative to the support arm or rod 116.

Particularly, the chassis or body 122 is allowed to move as shown with arrows 148 (linear movement in some cases or rotation or spinning about a rotation axis in some preferred embodiments) in response to user input or input forces, $F_{Input}$ shown at 140 from one or more of the passengers 123. To this end, a mounting sleeve (e.g., a hollow tube) 130 is extended over an end of the support arm or rod 116, and a bearing assembly 132 is disposed between the support arm or rod 116 and inner surfaces of the mounting sleeve 130. In this way, the mounting sleeve 130 is able to move as shown with arrows 144 relative to the support rod or arm 116 (e.g., to slide relative to it or to rotate about its central axis (which may be vertical in some cases)). To facilitate application of the user input 140 or $F_{Input}$, the vehicle 120 includes a user input mechanism 138 that is attached to the mounting sleeve 130 such that the user input 140 is transmitted through the user input mechanism 138 to the mounting sleeve 130 to cause the sleeve motion 144. The sleeve motion 144 is in turn transmitted to the chassis or body 122 by a static coupling 134 that attaches the mounting sleeve 130 to the chassis or body 122 such that the sleeve motion 144 causes the vehicle motion 148 relative to the support arm 116. Hence, the user input 140 directly causes the vehicle motion or movement 148 by moving the mounting sleeve 130 via the user input mechanism 138 (e.g., a drive or crank wheel or the like), and these movements 144 and 148 may be in one, two, or more directions (e.g., rotation or spinning in a clockwise and a counterclockwise direction).

The vehicle 120 also includes one or more electrical components 180 such as lights, display devices, audio elements, and the like, and there is a need to provide electrical power to the components and/or their controller 182. Significantly, the ride system 100 is adapted such that each vehicle 120 includes a kinetic energy conversion assembly with an electrical generator 150 that provides its output (electrical energy or electricity) 160 to a battery (or batteries) 170 or directly, in some cases, to the electrical components 180 (or their controller 182) so that their operations can change with the amount of user input 140 (or vehicle's kinetic energy magnitude), e.g., more volume from an audio element, brighter light, more colors, and/or a greater number of sources from a lighting system, and the like. The electrical generator 150 may take the form of an alternator that converts mechanical energy into electrical energy that can be provided as output 160, and the electrical generator 150 is mounted within the body 122 or upon an outer surface (e.g., the lower body wall or floor).

The generator 150 has an input shaft 152, and the conversion assembly includes a drive member 154 that couples or links the support arm or rod 116, which is static, to the input shaft 152 in a manner that transmits the vehicle motion 148 (e.g., rotation about the axis of the support shaft 116) to the input shaft 152 such that shaft 152 is rotated about its axis as shown with arrows 156. This input mechanical or kinetic energy is converted into electrical energy 160 by the electrical generator 150. The motion 148 and shaft rotation 156 of input shaft 152 may be in a single direction or, as shown, may be in two directions (CW and CCW), and the generator 150 (e.g., alternator) is chosen to be configured for rotation of its input shaft 152 in either direction to generate electricity 160 to charge the battery 170 or to directly power the electrical components 180 (or controller 182). The amount of electrical energy generated 160 is dependent upon the amount of kinetic energy provided in the vehicle motion 148 due to user input, $F_{Input}$, 140, and it may be stored in the battery 170 for the present operation of the system 100 as well as for later operations such that power for the electrical components 180 is available when the chassis 122 is not moving (no vehicle motion 148) during this ride and even for later rides (e.g., lights may be illuminated during load and unload operations when ride system 100 is not operating the ride path drive system 114).

Figure 2:
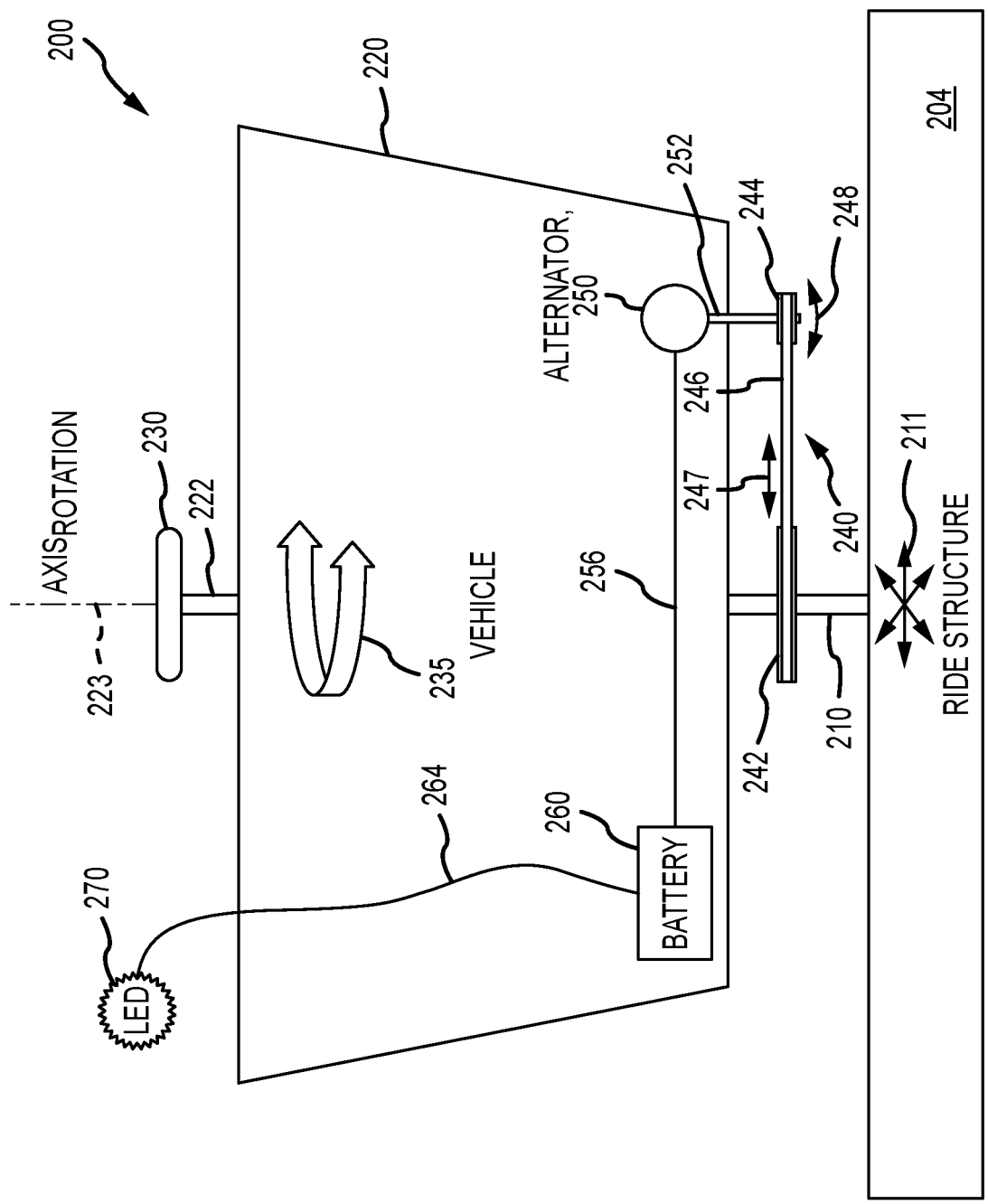
FIG. 2 is a side schematic view of one embodiment of the ride system of FIG. 1 adapted to convert the spinning movement of a ride vehicle into electrical power for onboard storage and use.

FIG. 2 is a side schematic view of one embodiment of a ride system 200 (e.g., an implementation of system 100 of FIG. 1) adapted to convert the spinning movement of a ride vehicle 220 into electrical power for onboard storage and use. As shown, the ride system 200 includes a ride structure 204 with a support arm or member 210 extending vertically upward. The ride structure 204 is adapted to move the support arm 210 in one or more directions 211 defining a ride path during operations of the ride system 200. The ride system 200 includes a vehicle chassis/body 220 adapted to receive one or more passengers (not shown in FIG. 2), and the vehicle chassis 220 is mounted upon the support arm 210 such that the vehicle chassis 220 moves 211 with the ride structure 204.

The vehicle chassis 220 is further pivotally coupled (e.g., via a bearing mechanism or the like (not shown but understood from FIG. 1)) to the support arm 210 via mounting sleeve 222 (e.g., a metal tube or cylinder or the like). In this way, the mounting sleeve 222 is able to rotate about the exterior of the support arm 210 and about a vertical rotation axis, $Axis_{Rotation}$ (e.g., the central axes of the mounting sleeve 222 and the support arm 210, which coincide in this example). As discussed with reference to system 100 of FIG. 1, the mounting sleeve 222 is in turn affixed to the vehicle chassis 220 such that rotation of the mounting sleeve 222 is transmitted to the vehicle chassis 220 as shown with arrows 235, which may be CW or CCW (or only one in other cases). A turn or crank wheel 230 is rigidly attached to the mounting sleeve 222 to facilitate passengers providing an input or force to impart kinetic energy to the chassis 220 by causing it to spin or rotate 235 during operations of the ride system 200.

A kinetic energy conversion assembly is provided in the ride system 200 to convert this kinetic or mechanical energy 235 of the chassis 220 into electrical energy or electricity. In this regard, a drive member 240 in the form of a belt, a chain, or the like is provided that is attached or supported to a first support (e.g., a gear, sprocket, wheel, or the like) 242 that is affixed to the support arm 210 so that it is stationary relative to the support arm 210. The drive member 240 is also attached or supported to a second support (another gear, sprocket, wheel, or the like) 244 that is allowed to rotate or spin as shown with arrows 248 (in CW and/or CCW direction). The drive member 240 moves 247 due to the spinning or rotation 235 of the vehicle chassis which drives the spinning 248.

The kinetic energy conversion assembly further includes an alternator 250 mounted on or in the chassis 220, and its drive or input shaft 252 extends outward from the alternator 250 (and from the chassis 220 in this non-limiting example). The opposite or outer end of the drive shaft 252 is rigidly coupled with the second support 244 to spin or rotate with it (about its central axis) as shown with arrows 248. The spinning 248 of the drive shaft 252 transfers the kinetic energy (or spinning 235) of the chassis 220 to the alternator 250. The alternative 250 is configured to convert this input mechanical or kinetic energy into electrical energy (or electricity) that is transmitted via lines 256 to a battery (or batteries) 260. The battery 260 is used to power via line(s) 264 on or in the chassis 220 electrical components such as illustrated LED 270. In other cases, an electrical component controller or driver may be directly connected to the alternator 250 to cause the electrical component(s) to be powered in real time by the spinning 235 (which causes movement 247 and spinning 248).

The amount of energy created by the alternator 250 during operation of ride 200 depends on how fast the chassis 220 is spun 235 as well as the gear ratio of the typically larger support member 242 to the typically smaller support/alternator support member 244, and, in this regard, it is generally preferred to have a larger gear ratio to cause the support member 244 and attached drive shaft 252 to spin more often with similar movements 235 of the chassis 220.

Figure 3:
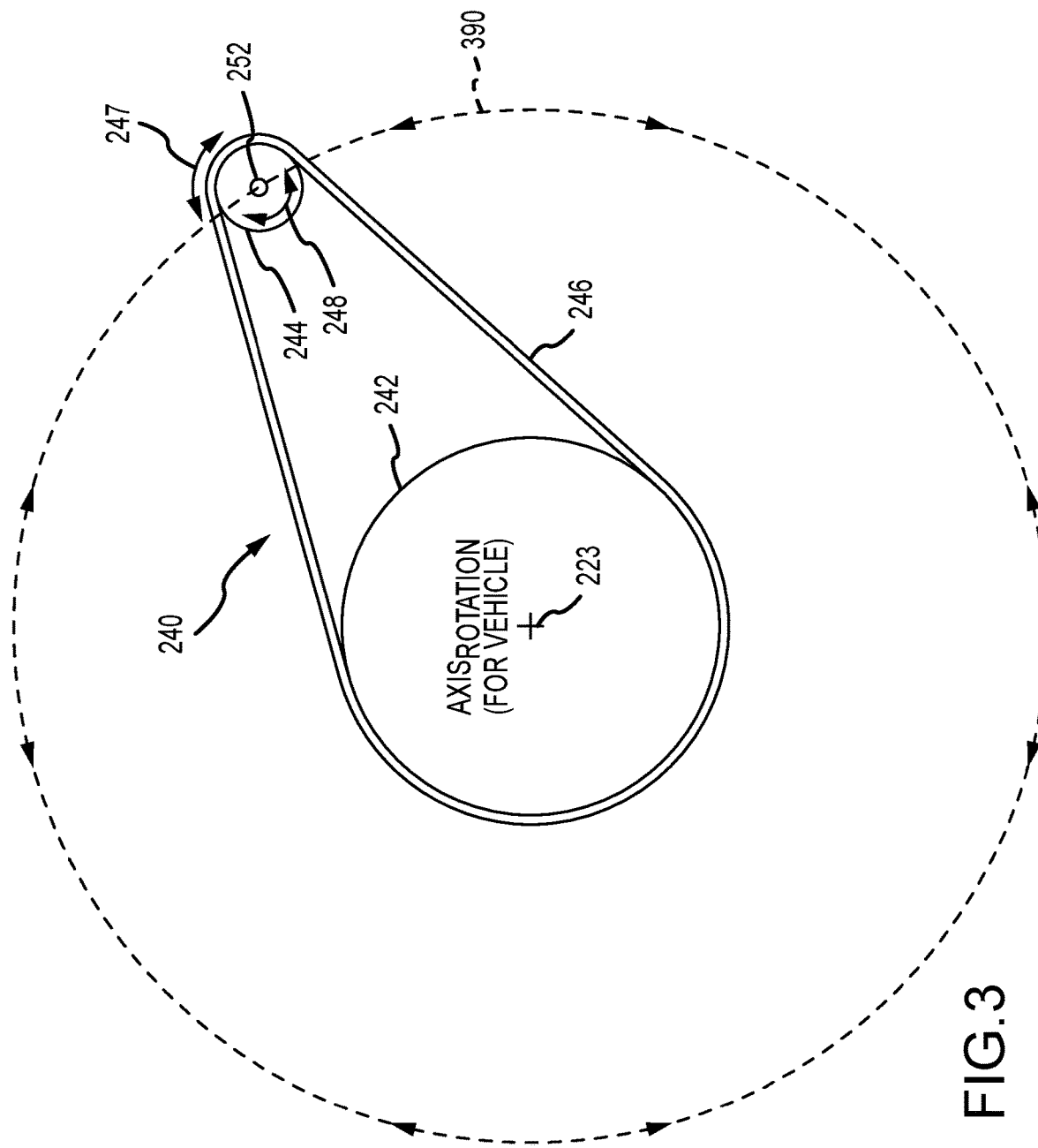
FIG. 3 is a bottom partial view of the ride system of FIG. 2 illustrating portions of the kinetic energy conversion assembly during operations of the ride system.

FIG. 3 is a bottom partial view of the ride system 200 of FIG. 2 illustrating portions of the kinetic energy conversion assembly during operations of the ride system 200. As shown, the axis of rotation, $Axis_{Rotation}$, for the vehicle extends through the center of static support member 242. Its OD is significantly larger than the OD of the rotatable support member 244, such as 2:1 to 5:1 or the like to provide a desired gear ratio for spinning 248 of the support member 244 and interlocked drive shaft 252. During operations of the ride system 200 and spinning of the chassis 220, the drive shaft 252 is caused to move along a circular path 390 with the chassis 220 because it is attached to the alternator 250 that is supported on or in the chassis 220. Since the support member 242 is static relative to the support arm of the 210 of the ride structure 210, the drive member 246 causes the movement of the shaft 252 on circular path 390 to be translated into application of forces on the support member 244 to cause the member 244 and interconnected shaft 252 to rotate about its central axis.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A ride system adapted to convert kinetic energy to electrical energy, comprising:
   a passenger vehicle with a chassis for receiving a passenger;
   a ride structure including a support arm supporting the passenger vehicle, wherein the ride structure moves the support arm along a ride path during operations of the ride system;
   a mounting sleeve statically attached to the chassis and pivotally coupled to the support arm;
   a user input mechanism attached to the mounting sleeve adapted to receive user input forces to cause the chassis to have movements relative to the support arm in response to the user input forces;
   an electrical component provided on or in the chassis; and
   a kinetic energy conversion assembly with an electrical generator converting kinetic energy of the chassis during the movements to electrical energy used to power the electrical component,
   wherein the electrical generator is mounted to the chassis, and
   wherein the kinetic energy conversion assembly includes a first support member statically mounted to the support arm, a second support member attached to an input drive shaft of the generator, and a drive member supported upon the first and second support members, whereby the spinning of the chassis causes the drive member to rotate the input drive shaft about its central axis.

2. The ride system of claim 1, wherein the movements of the chassis include spinning about a rotation axis extending through the mounting sleeve.

3. The ride system of claim 2, wherein the spinning is first in a counterclockwise direction and second in a clockwise direction during the movements.

4. The ride system of claim 2, wherein the electrical generator includes an alternator and further comprising a battery electrically coupled to an outlet of the alternator to store the electrical energy and electrically coupled to the electrical component.

5. The ride system of claim 1, wherein the first support member has an outer diameter and the second support member has an outer diameter and wherein the ratio of the outer diameter of the first support member to the outer diameter of the second support member is at least 2:1.

6. The ride system of claim 1, wherein the electrical component includes at least one of a light, a display element, and an audio element.

7. The ride system of claim 1, wherein the electrical component is coupled to the electrical generator to receive the electrical energy from the electrical generator during the movements of the chassis and wherein the electrical component has operations varying with a magnitude of the electrical energy.

8. A ride system adapted to convert kinetic energy to electrical energy, comprising:
   a vehicle with a body for receiving a passenger;
   a ride structure including an arm supporting the body of the vehicle, wherein the ride structure moves the arm and the body along a ride path during operations of the ride system;
   a mounting sleeve pivotally coupled to the arm;
   a user input mechanism attached to the mounting sleeve adapted to receive user input forces from the passenger and, in response, to transmit the user input forces to the body to cause spinning of the body relative to the arm;
   an electrical component provided onboard the body of the vehicle; and
   an electrical generator converting kinetic energy of the body during the spinning into electrical energy,
   wherein the electrical energy is used to power the electrical component,
   wherein the spinning is first in a counterclockwise direction and second in a clockwise direction during the movements,
   wherein the electrical generator includes an alternator,
   wherein the ride system further comprises a battery electrically coupled to an outlet of the alternator to store the electrical energy and electrically coupled to the electrical component or a controller of the electrical component, and
   wherein the ride system further comprises a first support member statically mounted to the arm, a second support member attached to an input drive shaft of the alternator, and a drive member supported upon or by the first and second support members, whereby the spinning of the body causes the drive member to rotate the input drive shaft about its central axis.

9. The ride system of claim 8, wherein the first support member has an outer diameter and the second support member has an outer diameter and wherein the ratio of the outer diameter of the first support member to the outer diameter of the second support member is at least 2:1.

10. The ride system of claim 9, wherein the drive member comprises a belt or chain and wherein the first and second support members each comprise a sprocket, a gear, or a pulley wheel.

11. The ride system of claim 8, wherein the electrical component is coupled to the electrical generator to receive the electrical energy from the electrical generator during the movements of the body and wherein the electrical component has operations that vary with a magnitude of the electrical energy.

12. A ride system adapted to convert kinetic energy to electrical energy, comprising:
   a vehicle with a chassis for receiving one or more passengers;
   a support arm supporting the vehicle, wherein the vehicle moves with the support arm along a ride path during operations of the ride system;
   a mounting member attached to the chassis and pivotally coupled to the support arm, whereby the mounting member and the chassis move together relative to the support arm;
   a mechanism attached to the mounting member adapted to receive user input causing the mounting member and the chassis to have spinning movements relative to the support arm in response to the user input;
   an electrical component provided on or in the chassis; and
   a kinetic energy conversion assembly with a battery and with an electrical generator using the spinning movement of the chassis to generate electrical energy stored in the battery for use in powering the electrical component,
   wherein the electrical component includes at least one of a light, a display element, and an audio element, wherein the electrical component is coupled to the electrical generator to receive the electrical energy from the electrical generator during the movements of the chassis, and wherein the electrical component has operations varying with a magnitude of the electrical energy.

13. The ride system of claim 12, wherein the spinning movement is in a counterclockwise direction or in a clockwise direction.

14. The ride system of claim 12, wherein the electrical generator includes an alternator and wherein the kinetic energy conversion assembly includes a first support member statically mounted to the support arm, a second support member attached to an input drive shaft of the alternator, and a drive member supported upon the first and second support members, whereby the spinning of the chassis causes the drive member to rotate the input drive shaft about its central axis.

15. The ride system of claim 14, wherein the first support member has an outer diameter and the second support member has an outer diameter and wherein the ratio of the outer diameter of the first support member to the outer diameter of the second support member is at least 2:1.

16. A ride system adapted to convert kinetic energy to electrical energy, comprising:
    a vehicle with a body for receiving a passenger;
    a ride structure including an arm supporting the body of the vehicle, wherein the ride structure moves the arm and the body along a ride path during operations of the ride system;
    a mounting sleeve pivotally coupled to the arm;
    a user input mechanism attached to the mounting sleeve adapted to receive user input forces from the passenger and, in response, to transmit the user input forces to the body to cause spinning of the body relative to the arm;
    an electrical component provided onboard the body of the vehicle; and
    an electrical generator converting kinetic energy of the body during the spinning into electrical energy,
    wherein the electrical energy is used to power the electrical component,
    wherein the spinning is first in a counterclockwise direction and second in a clockwise direction during the movements,
    wherein the electrical component is coupled to the electrical generator to receive the electrical energy from the electrical generator during the movements of the body, and
    wherein the electrical component has operations that vary with a magnitude of the electrical energy.

17. The ride system of claim 16, wherein the electrical generator includes an alternator and wherein the ride system further comprises a battery electrically coupled to an outlet of the alternator to store the electrical energy and electrically coupled to the electrical component or a controller of the electrical component.

18. The ride system of claim 17, further comprising a first support member statically mounted to the arm, a second support member attached to an input drive shaft of the alternator, and a drive member supported upon or by the first and second support members, whereby the spinning of the body causes the drive member to rotate the input drive shaft about its central axis, and wherein the first support member has an outer diameter and the second support member has an outer diameter and wherein the ratio of the outer diameter of the first support member to the outer diameter of the second support member is at least 2:1.

19. The ride system of claim 18, wherein the drive member comprises a belt or chain and wherein the first and second support members each comprise a sprocket, a gear, or a pulley wheel.

* * * * *